US006258388B1

(12) United States Patent
Fukuda et al.

(10) Patent No.: US 6,258,388 B1
(45) Date of Patent: Jul. 10, 2001

(54) FEED FOR A LAYER

(75) Inventors: Kenichi Fukuda; Tamotsu Suzuki; Hiroshi Horikawa, all of Tochigi (JP)

(73) Assignee: Itochu Feed Mills Co., Ltd. (JP)

( * ) Notice: Subject to any disclaimer, the term of this patent is extended or adjusted under 35 U.S.C. 154(b) by 0 days.

(21) Appl. No.: 09/577,050

(22) Filed: May 24, 2000

(30) Foreign Application Priority Data

May 27, 1999 (JP) .................................................. 11-148247
Nov. 1, 1999 (JP) .................................................. 11-310576

(51) Int. Cl.$^7$ ............................ A23L 1/052; A23K 1/18; A23K 1/175
(52) U.S. Cl. .............................. 426/2; 426/635; 426/648; 426/805
(58) Field of Search ............................... 426/2, 805, 635, 426/648

(56) References Cited

U.S. PATENT DOCUMENTS

| | | | | |
|---|---|---|---|---|
| 4,519,951 | * | 5/1985 | Qualcatti et al. | 260/409 |
| 4,976,971 | * | 12/1990 | Laurent et al. | 426/2 |
| 5,043,170 | * | 8/1991 | Borenstein et al. | 426/73 |
| 5,085,871 | * | 2/1992 | Horikawa et al. | 426/2 |
| 5,252,345 | * | 10/1993 | Hu et al. | 424/684 |
| 5,624,671 | * | 4/1997 | Araki et al. | 424/195.1 |
| 5,937,790 | * | 8/1999 | Ito et al. | 119/174 |

FOREIGN PATENT DOCUMENTS

| | | | |
|---|---|---|---|
| 57-026549 | * | 2/1982 | (JP) . |
| 59-021354 | * | 2/1984 | (JP) . |
| 14 89693 | * | 6/1989 | (SU) . |

OTHER PUBLICATIONS

El–Nadi et al., Minufiya J. Agri. Res., vol. 8, pp. 235–55, 1984.*
Ding et al., Asian–Australas. J. Anim. Sci., vol. 5 (2), pp. 217–224, 1992.*
Hess et al., Poultry Sci., vol. 76(5), pp. 703–710, May 1997.*
Waddell et al., Bristish Poultry Sci., vol. 32(4), pp. 853–64. 1991.*

* cited by examiner

Primary Examiner—Chhaya D. Sayala
(74) Attorney, Agent, or Firm—Burns, Doane, Swecker & Mathis, L.L.P.

(57) ABSTRACT

A magnesium-enriched vegetable feed composition for a layer which improves the eggshell quality and which prevents the occurrence of shell mottling. The feed consists essentially of a vegetable feed, the magnesium content in said vegetable feed being in the range of 0.21–0.28% by weight.

4 Claims, 5 Drawing Sheets

FEED FOR A LAYER

BACKGROUND OF THE INVENTION

A. Field of the Invention

The present invention relates to a feed for a layer, and more particularly to a feed for a layer which prevents the decline in eggshell quality which occurs when only vegetable feed is fed to a layer without being blended with any animal feed.

B. Description of the Related Art

There has been extensively used a feed for a layer which comprises animal feeds having a high metabolic energy such as fish meal, meat and bone meal and the like as the main component from the aspects of the economy and securing acceptable eggshell strength. Recently, there has been increased fear regarding the safety of animal feed with the possibility of an increase in food poisoning by Salmonella which gets into the inside of eggs due to the decline in the quality of the animal protein raw material and due to unsanitary treatment during its processing step, and correspondingly consumption of value added eggs has been expanded. Under these circumstances, there is a high tendency to shift the feed for a layer to a complete vegetable feed which contains no animal protein raw material. However, feeding of vegetable feed alone to a layer causes the deterioration (decline) in the eggshell quality of the produced eggs and causes a relative decrease in the number of eggs having a sufficient eggshell strength so that they stand up to handling including the selection of the eggs depending on size by machinery and transportation (delivery). The deterioration in eggshell quality leads to an increase in egg breakage rate and to selling of inexpensive liquid egg, thus giving an economical loss to layer feeding farmers. It also causes an increase in black spots appearing on the surface of the eggshell (so-called "shell mottling") which decreases the value of the eggs.

BRIEF SUMMARY OF THE INVENTION

An object of the present invention is to provide a feed for a layer which improves the decline in eggshell quality which occurs when feed consisting essentially of vegetable raw material as protein and energy sources is fed to a layer.

As a result of having ardently studied to achieve the above object, the present inventors have found that even when the protein and metabolic sources present in the compound feed for a layer were shifted to the vegetable feed with supplementation of a sufficient amount of the nutrients necessary for the formation of the eggshell, such as calcium, phosphorous and vitamin $D_3$, the formed eggshell becomes soft and that the cause of soft eggshell formation is due to the fact that the magnesium content in the complete vegetable feed and further in the eggshell of the produced eggs is smaller than that in the conventional animal raw material compound feed. The present inventors have further found that the eggshell quality may be significantly improved by increasing the magnesium content in the complete vegetable feed to a certain range thereby attributing greatly to the improvement in the egg crack rate (the ratio of cracked eggs to total eggs) in the egg production farm and to preventing the occurrence of shell mottling and have accordingly completed the present invention.

That is, one aspect of the present invention relates to a feed for a layer which improves eggshell quality and which consists essentially of a vegetable feed, the magnesium content in said vegetable feed being in the range of 0.21 to 0.28% by weight.

DETAILED DESCRIPTION OF THE INVENTION

Figure 1:
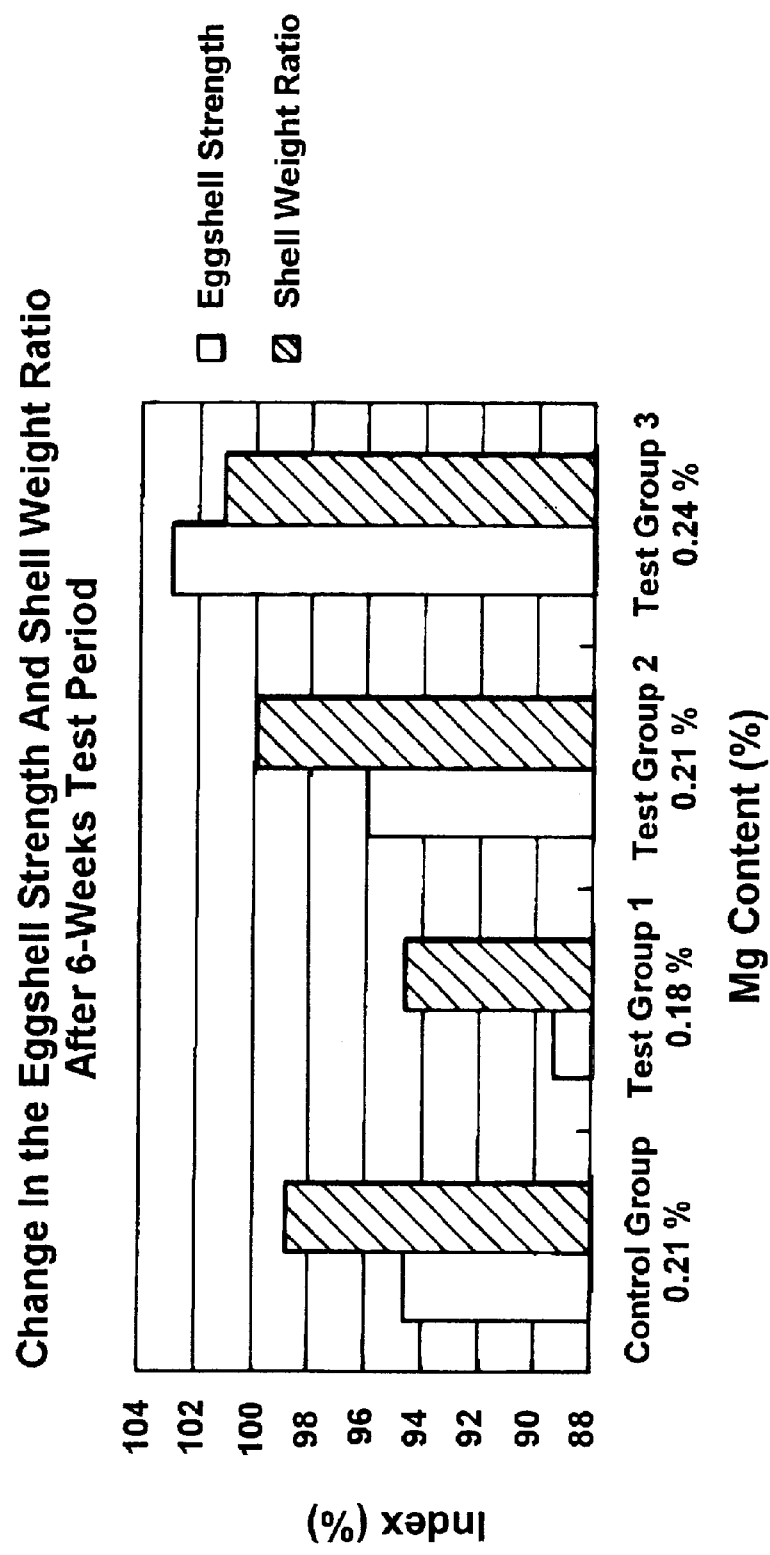
FIG. 1 graphically illustrates the changes in the eggshell strength and the ratio of eggshell weight to egg weight in Example 1.

The feed for a layer in the present invention is one wherein both a protein source and a metabolic energy source to be incorporated into said feed are limited to vegetable raw materials and the magnesium content is adjusted to the range defined above.

The other components of the feed may be the same as conventional feeds for layers and include a protein source, an energy source, a calcium source, a phosphorus source, vitamins, minerals and the like and which may be blended in such amount as to meet the requirements of NRC and Japanese Feeding Standard. As a vegetable raw material, there may be selected from among the cereals such as corn, wheat, barley and milo; bran, wheat bran, rice bran, defatted rice bran, soybean meal, rapeseed meal, coconut meal, and linseed meal. It is necessary to incorporate a calcium source, a phosphorus source, vitamins, minerals and the like into the feed like the conventional feed. The feed contains 15.5–19.5% by weight of crude protein, 3.5–4.5% by weight of calcium, 0.35–0.45% by weight of non-phytin phosphorus (e.g., tricalcium phosphate, dicalcium phosphate) and about 2800–2950 kcal/kg of ME (Metabolizable Energy).

Vegetable raw material contains a very small amount of magnesium, and defatted rice bran contains a relatively large amount of magnesium. According to standard tables of feed composition in Japan, defatted rice bran contains 1.26% by weight of magnesium and it has often been used as a diluent for a mineral and vitamin premix. Even in the case where such premix is incorporated into the feed, the magnesium content in the feed does not exceed 0.18% by weight.

Even in the case that a layer is fed with the required amount of calcium and phosphorus which have an important action in the formation of eggshell, the magnesium content in the complete vegetable feed hitherto used is about 0.15–0.18% by weight. Thus, magnesium tends to be deficient thereby causing the decline in the eggshell quality. Contrary thereto, an improvement in the eggshell quality may be achieved by adjusting the magnesium content in the complete vegetable feed to 0.21% or more, preferably to the range of 0.21–0.28%.

Examples of a magnesium supply source include an organic magnesium derived from vegetable raw material and an inorganic magnesium derived from magnesium sulfate, magnesium carbonate, magnesium oxide, vermiculite and the like. From the standpoint of view of high magnesium content, especially defatted rice bran is preferable as organic magnesium source, and especially calcined vermiculite wherein the magnesium content is about 12.8% by weight is preferable as an inorganic magnesium source.

The organic magnesium source and the inorganic magnesium source may be used singly. However, it is preferable to use them in combination for a greater improvement in the eggshell quality. In this case, the combining ratio of (a) organic magnesium to (b) inorganic magnesium in the complete vegetable feed is preferably 6:1–8:1 in the terms of magnesium. For the preparation of the feed having such combining ratio, it is recommended that the magnesium content in the complete vegetable feed is preliminarily adjusted to about 0.15–0.18% by weight with defatted rice bran which contains a relatively large amount of magnesium as an organic magnesium source and is finally adjusted to the above preferred range with an inorganic magnesium source.

The following Examples illustrate the present invention more specifically, but the present invention is not restricted thereto.

EXAMPLE 1

A Test Regarding the Improving Effect of the Magnesium Content in a Complete Vegetable Feed on Eggshell Quality 1. Test Conditions
(a) Test Chicken White leghorn species JULIA chickens of 480 days old were used. Usually layers beyond 450 days old lay eggs having inferior eggshell quality irrespective of the feed efficiency.

(b) Feeding Condition

Each of the layers was reared in single cage in an open henhouse. Light was provided for 16 hours each day.

(c) Test Feed

As a basic feed for 3 test groups, the complete vegetable feed (2870 kcal/kg of ME, 17.5% of CP (crude protein), 3.50% of Ca, 0.18% of Mg) shown in Table 1 was used. Only for the control group the conventional feed supplemented with animal protein raw material (2870 kcal/kg, 17.5% of CP, 3.50% of Ca, 0.21% of Mg) was used (see Table 1 regarding the components incorporated therein). Powdered magnesium sulfate was incorporated into the complete vegetable feed in such amount that the total magnesium content is 0.21% or 0.24%, thus providing 4 groups in total i.e. a control group (animal protein feed group wherein Mg content is 0.21%), complete vegetable feed Test Group 1 (no magnesium sulfate addition group wherein Mg content is 0.18%), complete vegetable feed Test Group 2 (magnesium sulfate-addition group wherein Mg content is 0.21%) and complete vegetable feed Test Group 3 (magnesium sulfate-addition group wherein Mg content is 0.24%).

The magnesium content was determined by atomic absorption spectrometry after a conventional ashing procedure.

TABLE 1

|  | Complete Vegetable Feed | Control Feed (Containing Animal Protein) |
|---|---|---|
| Corn | 63% | 65% |
| Defatted Rice Bran | 0 | 2 |
| Soybean Meal | 19 | 15 |
| Rapeseed Meal | 2 | 1 |
| Fish Meal | 0 | 3 |
| Meat Born Meal | 0 | 3 |
| Corn Gluten Meal | 4 | 1.5 |
| Soybean Oil | 2.5 | 1.5 |
| Calcium Carbonate | 8.5 | 7 |

TABLE 1-continued

|  | Complete Vegetable Feed | Control Feed (Containing Animal Protein) |
|---|---|---|
| Premix[*1] | 1 | 1 |
| Total | 100% | 100% |

Note)[*1] premix is composed of vitamin A, vitamin $B_1$, vitamin $B_2$, vitamin $B_6$, vitamin $B_{12}$, pantothenic acid, nicotinamide, vitamin D, vitamin B, vitamin K and trace minerals (Cu, Zn, Mn and Fe)

2. Test Results

Each group consisting of 15 layers was fed the above allocated feed for 6 weeks up to 515 days old, and the eggshell strength and the eggshell weight ratio (ratio of eggshell weight to egg weight) were measured. The changes in the eggshell strength and the eggshell weight ratio between the start of the test and the end of 6 weeks of test are illustrated in FIG. 1 where the results measured at the starting time of the test were counted as 100. It can be seen from FIG. 1 that the eggshell quality may be significantly improved by adjusting the magnesium content in the complete vegetable feed to 0.21% or more.

EXAMPLE 2

A Test Regarding the Improving Effect of Organic and Inorganic Magnesium Content in a Complete Vegetable Feed on Eggshell Quality 1. Test Conditions
(a) Test Chicken White leghorn species JULIA chickens of 492 days old were used.

(b) Feeding Condition

Feeding was conducted under the same condition as in Example 1.

(c) Test Feed

It was allocated to the total 6 groups shown in Table 2 using the same complete vegetable feed as in Example 1: no magnesium addition group (control group), an organic magnesium source defatted rice bran alone-addition group (Test Group 1), an inorganic magnesium source magnesium sulfate alone-addition group (Test Group 2), an inorganic magnesium source magnesium carbonate alone-addition group (Test Group 4), an organic/inorganic mixture-addition group (Test Groups 3 and 5), the magnesium content in the complete vegetable feed having been adjusted to 0.24%.

TABLE 2

|  | Mg Derived from Feed[*1] | Mg Derived from $MgSO_4$ | Mg Derived from $MgCO_3$ | Total Mg Content (%) |
|---|---|---|---|---|
| Control Group | 0.18 | — | — | 0.18 |
| Test Group 1 | 0.24 | — | — | 0.24 |
| Test Group 2 | 0.18 | 0.06 | — | 0.24 |
| Test Group 3 | 0.21 | 0.03 | — | 0.24 |
| Test Group 4 | 0.18 | — | 0.06 | 0.24 |
| Test Group 5 | 0.21 | — | 0.03 | 0.24 |

Note)[*1]: Mg derived from feed was adjusted with defatted rice bran containing 1.26% of Mg.

2. Test Results

Figure 2:
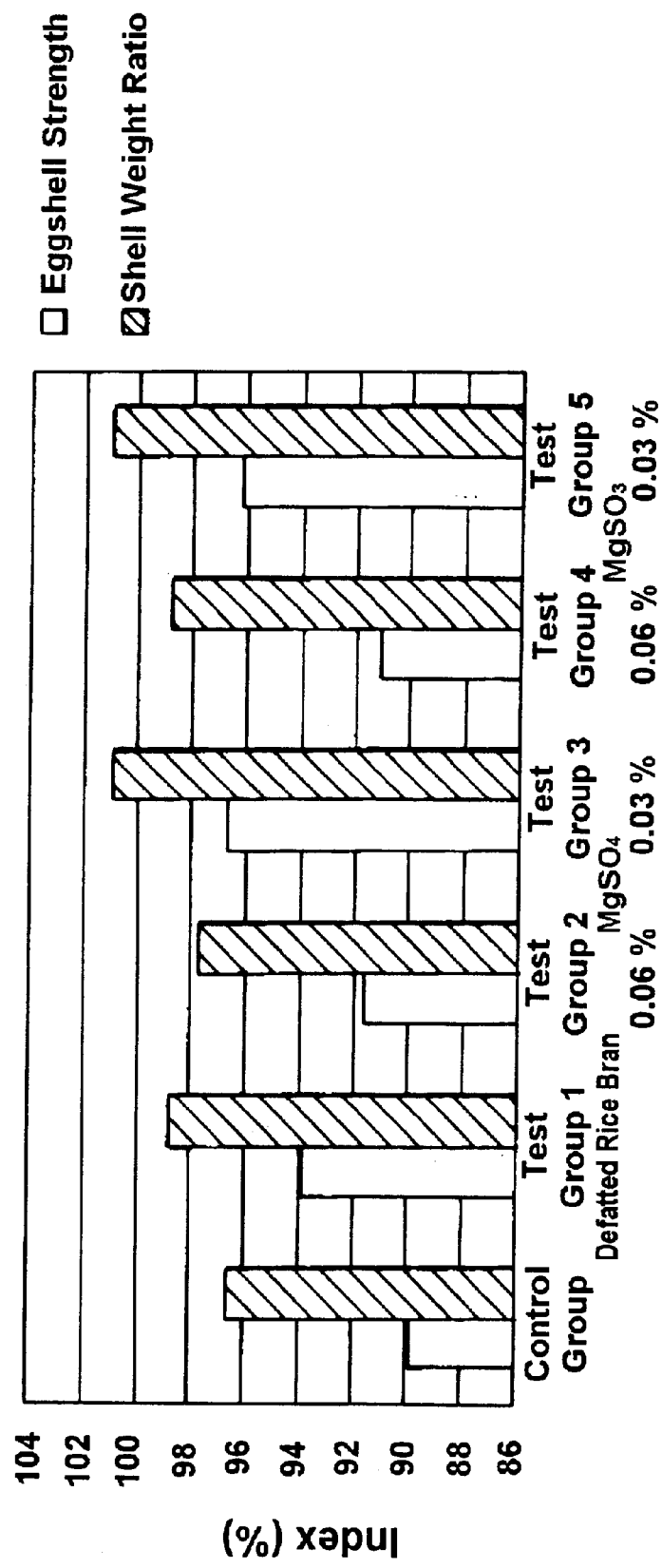
FIG. 2 graphically illustrates the changes in the eggshell strength and the ratio of eggshell weight to egg weight in Example 2.

Each group consisting of 15 layers was fed the above allocated feed for 6 weeks up to 527 days old, and the eggshell strength and the eggshell weight ratio (ratio of the eggshell weight to the egg weight) were measured. The changes in the eggshell strength and the eggshell weight ratio at the start of the test and at the end of 6 weeks of test period were as shown in FIG. 2 where the results measured at the start of the test were counted as 100. The eggshell quality in all Test Groups was improved as compared with the Control Group, and especially the improving effect was significant in cases of Test Groups 3 and 5 where an organic-inorganic magnesium mixture was added. Almost the same result was recognized between Test Groups 2 and 4 where magnesium sulfate and magnesium carbonate were added, respectively.

EXAMPLE 3

A Test Regarding the Improving Effect of Vermiculite Incorporated Into a Vegetable Feed as Inorganic Magnesium Source on Eggshell Quality 1. Test Conditions (a) Test Chicken White leghorn species TX-35 chickens of 448 days old were used.

(b) Feeding Condition

Feeding was conducted under the same condition as in Example 1.

(c) Test Feed

As shown in table 3, magnesium sulfate or calcined vermiculite was incorporated into the same complete vegetable feed as in Example 1 in such amount that the magnesium content therein became 0.21% or 0.24% for the Test Groups. There was employed calcined vermiculite containing about 12.8% of magnesium and having a solubility (effective amount) of 1.41% in hydrochloric acid-acidified region of pH 2 which is supposed to be the inside of chicken's intestine ("calcined vermiculite" a trade name, importer and distributor: Itochu Ceramics Co., Ltd.).

TABLE 3

|  | Mg Derived from Feed | Mg Derived from MgSO$_4$ | Mg Derived (Calcined Vermiculite*[1]) | Total Mg Content (%) |
| --- | --- | --- | --- | --- |
| Control Group | 0.18 | — | — | 0.18 |
| Test Group 1 | 0.18 | 0.06 | — | 0.24 |
| Test Group 2 | 0.18 | — | 0.06 | 0.24 |
| Test Group 3 | 0.18 | — | 0.03 | 0.21 |

Note)*[1]: Mg derived from calcined vermiculite was adjusted in the effective amount.

2. Test Results

Figure 3:
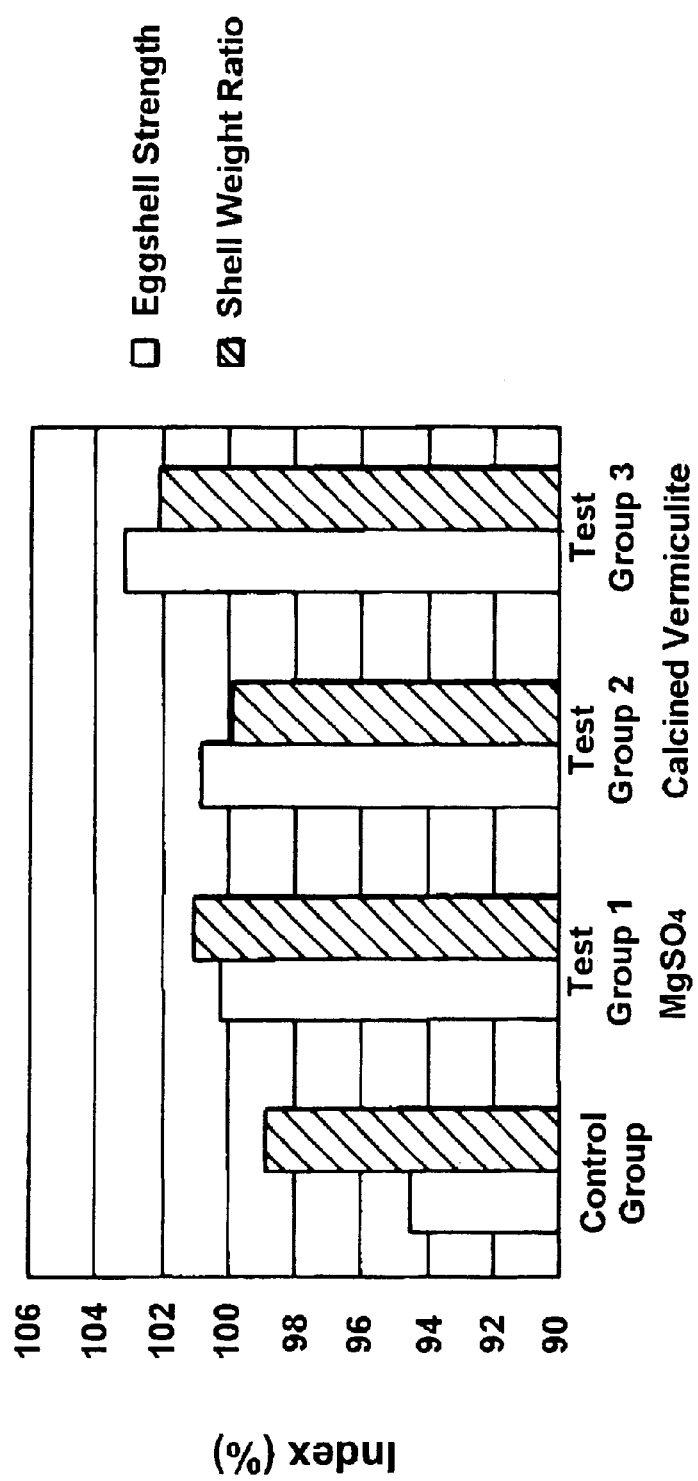
FIG. 3 graphically illustrates the changes in the eggshell strength and the ratio of eggshell weight to egg weight in Example 3.

Each group consisting of 15 layers was fed with the above allocated feed for 6 weeks up to 483 days old, and the eggshell strength and the eggshell weight ratio (ratio of the shell weight to the egg weight) were measured. The changes in the eggshell strength and the eggshell weight ratio at between the start of the test and the end of 6 weeks of test period are illustrated in FIG. 3 where the results measured at the start of the test were counted as 100.

It was recognized that the eggshell quality was improved in all Test Groups where the magnesium content in the complete vegetable feed is 0.21% or more.

Also, the results measured with respect to the water content, the crude fat content and the crude protein content in the poultry manure immediately after the completion of 6 weeks-test are shown in Table 4.

TABLE 4

|  | Control Group | Test Group 1 (Addition of MgSO$_4$) | (Addition of Calcined Vermiculite) | |
| --- | --- | --- | --- | --- |
|  |  |  | Test Group 2 | Test Group 3 |
| Water Content (%) | 72.6 | 73.1 | 69.2 | 69.5 |
| Crude Fat Content (%) | 1.05 | 1.03 | 1.05 | 0.83 |
| Crude Protein Content (%) | 11.45 | 15.18 | 13.61 | 11.38 |

Note) There was gathered all poultry manure for 2 days after the completion of 6 weeks-test.

Crude fat and crude protein are shown in the ratio to the fresh poultry manure.

It was recognized from the results listed in Table 4 that Test Groups 2 and 3 where calcined vermiculite was added showed an appreciable decrease in the water content with accompanying effect that the poultry manure became dry to some extent. Also, Test Group 3 showed an appreciable decrease in the crude fat content and the crude protein content as compared with control group, Test Groups 1 and 2, and thus suggested the improvement in efficiency of feed utilization.

EXAMPLE 4

A Test Conducted with Numerous Layers on a Field Scale

1. Test Conditions (a) Test Chicken

White leghorn species JULIA chickens were divided into 2 groups, i.e., Control Group and Test Group each consisting of about 42,000 chickens that were reared in a henhouse.

(b) Feeding Condition

Feeding was conducted under the same condition is in Example 1 except that a plural of layers were reared in cage.

(c) Test Feed

Magnesium sulfate was added to a commercial complete vegetable feed feed "FA16L" (a trade name, a product of Itochu Feed Mills Co., Ltd. 2850 kcal/kg of ME, 16.0% of CP content, 3.60% of Ca content, 0.38% of non-phitin phosphorous content and 0.18% of Mg content) in such amount that Mg content in the feed became 0.21% to prepare a test feed. And, control feed which contains no magnesium sulfate was prepared.

1. Test Results

Figure 4:
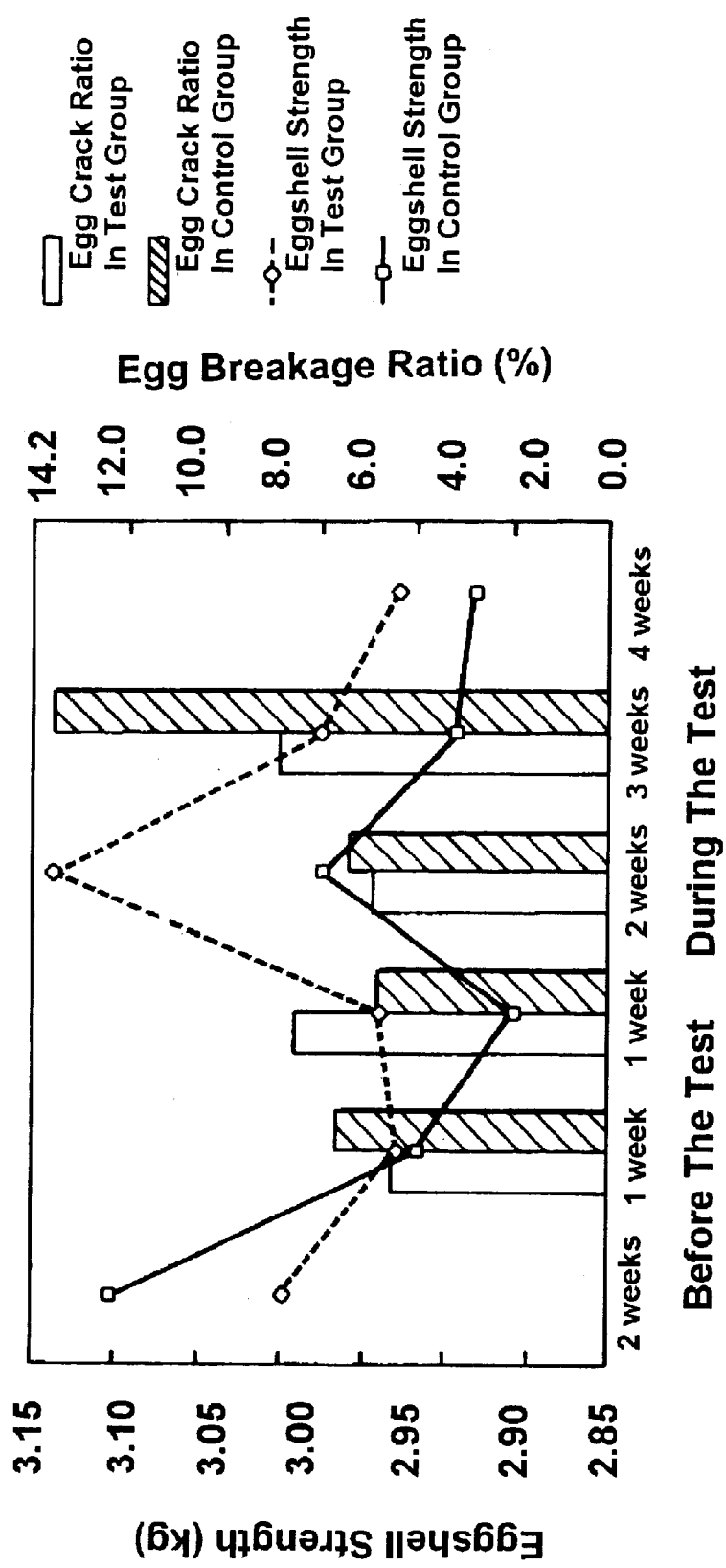
FIG. 4 graphically illustrates the changes in the eggshell strength and the egg crack ratio in Example 4.

A reading test was conducted for 4 weeks with the respective feeds to measure the eggshell strength and to survey the ratio of egg cracking occurred in a GP (Grading and Packing) treating place at which washing and packing operations of eggs have done. The measurement of eggshell strength was done using 100 eggs at a time. The survey of the ratio of egg cracking in the GP treating place was done using 1,500 eggs at a time. The changes in the eggshell strength and the ratio of egg cracking are illustrated in FIG. 4. As can be seen from FIG. 4, the eggshell strength and the ratio of egg cracking were improved by enrichment of Mg in the complete vegetable feed.

EXAMPLE 5

A Test Regarding Improving Effect of Organic and Inorganic Magnesium Contained in the Complete Vegetable Feed on the Shell Mottling 1. Test Conditions (a) Test Chicken White leghorn species TX-35 chickens of 151 days old were used (b) Feeding Condition Feeding was conducted under the same condition as in Example 1.

(c) Test Feed

A commercial feed for a layer "LAYER-1 8" a trade name, a product of Itochu Feed Mills Co., Ltd. 2850 kcal/kg of ME, 18.0% of CP content, 3.20% of Ca content, 0.18% of Mg content) was used for control group. A mixture of magnesium sulfate, defatted rice bran and calcined vermiculite (4:5:1 ratio by weight) was added in an amount of 0.3% to the same feed as in control group thereby adjusting the Mg content in the feed to 0.21% to prepare a feed for test group.

(d) Test Eggs

There were used 1,200 eggs laid when layers was fed with the feed for 2 weeks.

2. Test Results

There was inspected the status of shell mottling occurred when the test eggs were stored at an ordinary temperature for 3, 5 and 7 days. The degree of shell mottling was evaluated according to the following 3-stage:

High mottling occurred on the entire surface of shell. The shell remains translucent (especially this level becomes problem).

Middle mottling occurred on 30% to 50% of the entire surface of shell, which was marked with large spots.

Low mottling occurred very slightly on the surface of shell.

Figure 5:
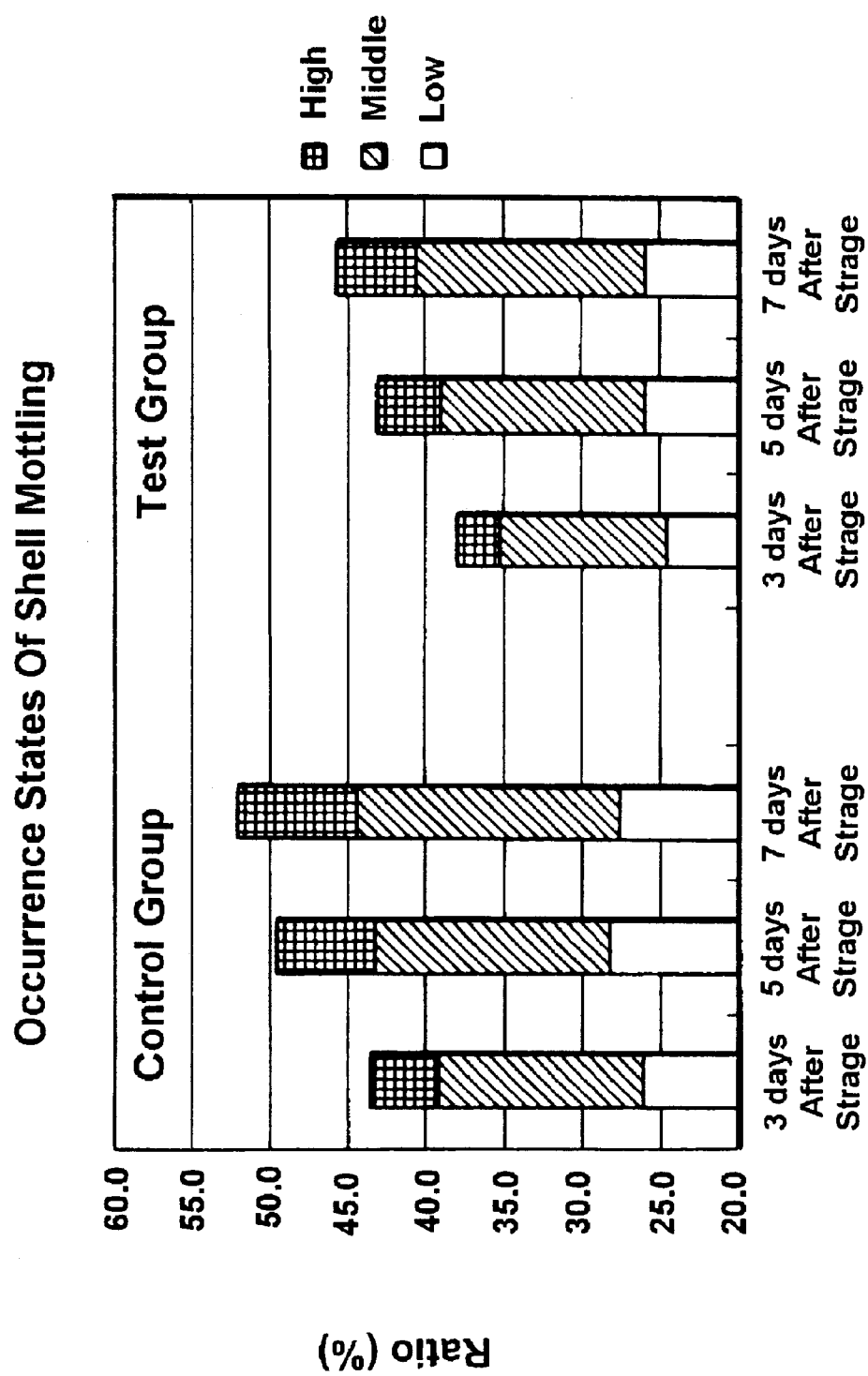
FIG. 5 graphically illustrates the relationship between the preservation days of eggs and the occurrence of shell mottling in Example 5.

The change in the degree of shell mottling occurred among the given storage days are illustrated in FIG. 5. It was confirmed that Test Group prevents significantly the occurrence of shell mottling as compared with Control Group.

According to the present invention, the magnesium content in the complete vegetable feed is adjusted to 0.21% or more thereby not only the eggshell quality, especially eggshell strength can be improved but also the occurrence of shell mottling can be prevented.

We claim:

1. A feed for a layer which improves eggshell quality, which consists essentially of a vegetable feed, the magnesium content in said vegetable feed being in the range of 0.21–0.28% by weight.

2. The feed for a layer as claimed in claim 1 wherein the magnesium is present as a blend of an organic magnesium source and an inorganic magnesium source, said organic magnesium source being defatted rice bran, and said inorganic magnesium source being at least one selected from the group consisting of magnesium sulfate, magnesium carbonate and vermiculate.

3. The feed for a layer as claimed in claim 2 wherein the blend ratio of (a) organic magnesium source to (b) inorganic magnesium source is 6:1–8:1 in the terms of magnesium.

4. A method for feeding a layer which comprises feeding the layer with a feed which consists essentially of a vegetable feed, the magnesium content in said vegetable feed being in the range of 0.21–0.28% by weight.

* * * * *